United States Patent
Seyama et al.

(10) Patent No.: US 7,356,018 B2
(45) Date of Patent: Apr. 8, 2008

(54) COMMUNICATION SYSTEM, COMMUNICATION DEVICE, AND COMMUNICATION METHOD

(75) Inventors: Hideo Seyama, Tama (JP); Tomoaki Hirota, Tama (JP); Wataru Watanabe, Tama (JP); Yoshihide Majima, Tama (JP)

(73) Assignees: Mitsumi Electric Co., Ltd., Tokyo (JP); Nintendo Co., Ltd., Kyoto (JP)

(*) Notice: Subject to any disclaimer, the term of this patent is extended or adjusted under 35 U.S.C. 154(b) by 516 days.

(21) Appl. No.: 10/881,265

(22) Filed: Jun. 30, 2004

(65) Prior Publication Data

US 2005/0030933 A1 Feb. 10, 2005

(30) Foreign Application Priority Data

Aug. 6, 2003 (JP) .............................. 2003-206299

(51) Int. Cl.
*H04J 3/16* (2006.01)
*H04Q 7/24* (2006.01)

(52) U.S. Cl. .................. 370/346; 370/449; 455/464
(58) Field of Classification Search ............... None
See application file for complete search history.

(56) References Cited

U.S. PATENT DOCUMENTS

| 5,297,144 A | 3/1994 | Gilbert et al. |
| 5,654,968 A | 8/1997 | Smiroldo |
| 6,128,504 A * | 10/2000 | Ciccone ................ 455/464 |
| 6,545,999 B1 * | 4/2003 | Sugita ................... 370/347 |
| 2003/0002442 A1 | 1/2003 | Flammer et al. |
| 2003/0125087 A1 * | 7/2003 | Shimizu ................ 455/561 |
| 2004/0233873 A1 * | 11/2004 | Lee et al. ............. 370/335 |

FOREIGN PATENT DOCUMENTS

| JP | 06-276197 | 9/1994 |
| JP | 08-056189 | 2/1996 |
| JP | 08-288955 | 11/1996 |
| JP | 09-321758 | 12/1997 |
| JP | 11-032077 | 2/1999 |
| JP | 2002/199473 | 7/2002 |
| JP | 2003-198576 | 7/2003 |

* cited by examiner

*Primary Examiner*—Erika A. Gary
(74) *Attorney, Agent, or Firm*—Ladas & Parry LLP (57) ABSTRACT

A communication system including a master station communication device and multiple slave station communication devices is disclosed. The master station communication device transmits a transmission request simultaneously to the slave station communication devices. The transmission request includes identification information identifying one or more of the slave station communication devices that are authorized to transmit information and time information indicating duration of time for which the one or more of the slave station communication devices are authorized to transmit the information. The one or more of the slave station communication devices transmit the information to the master station communication device based on the transmission request transmitted from the master station communication device.

11 Claims, 11 Drawing Sheets

| AP | Poll | RX | Poll | RX | Poll | RX | Poll | RX | Poll | RX | Poll | RX | Poll | RX | Poll | RX |
|---|---|---|---|---|---|---|---|---|---|---|---|---|---|---|---|---|
| STA #0 | | TX | | | | | | | | | | | | | | |
| STA #1 | | | | TX | | | | | | | | | | | | |
| STA #2 | | | | | | TX | | | | | | | | | | |
| STA #3 | | | | | | | | TX | | | | | | | | |
| STA #4 | | | | | | | | | | TX | | | | | | |
| STA #5 | | | | | | | | | | | | TX | | | | |
| STA #6 | | | | | | | | | | | | | | TX | | |
| STA #7 | | | | | | | | | | | | | | | | TX |
| TIME | T10 | T11 | T12 | T13 | T14 | T15 | T16 | T17 | T18 | T19 | T20 | T21 | T22 | T23 | T24 | T25 |

COMMUNICATION SYSTEM, COMMUNICATION DEVICE, AND COMMUNICATION METHOD

BACKGROUND OF THE INVENTION

Cross-Reference to Related Applications

This application is based upon and claims the benefit of priority from prior Japanese Patent Application No. 2003-206299, filed Aug. 6, 2003, the entire contents of which are incorporated herein by reference.

1. Field of the Invention

The present invention relates generally to communication systems, communication devices, and communication methods, and more particularly to a communication system in which master and slave stations perform communications by polling and to a communication device and method employed therein.

2. Description of the Related Art

According to the conventional polling communication method, a master station polls preregistered slave stations one after another so as to obtain information therefrom.

Figure 1:
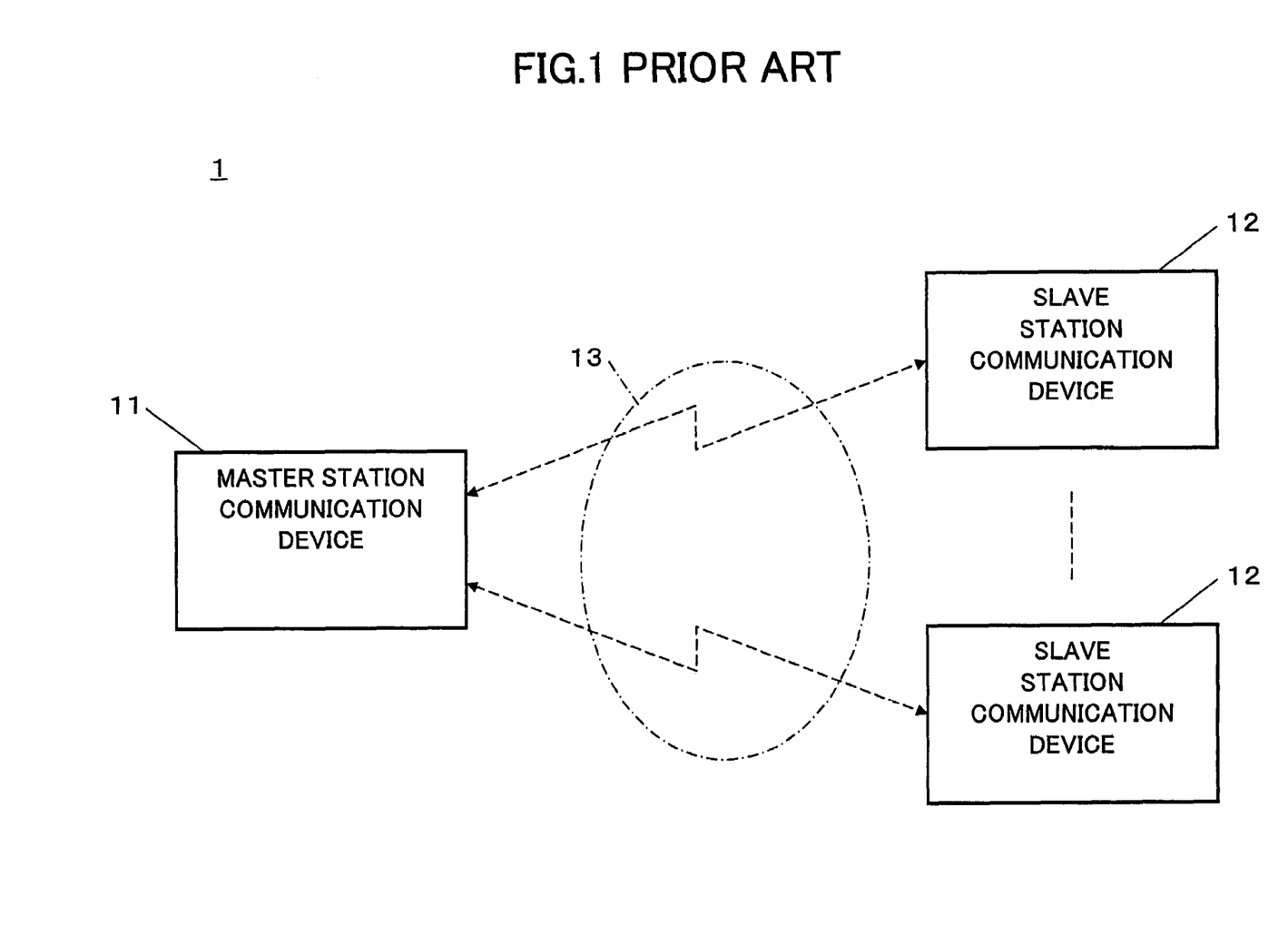
FIG. 1 is a diagram showing a conventional polling communication system.

FIG. 1 is a diagram showing a conventional polling communication system 1.

The polling communication system 1 is configured so that a master station communication device 11 and multiple preregistered slave station communication devices 12 can communicate with each other via a network 13.

Figure 2:
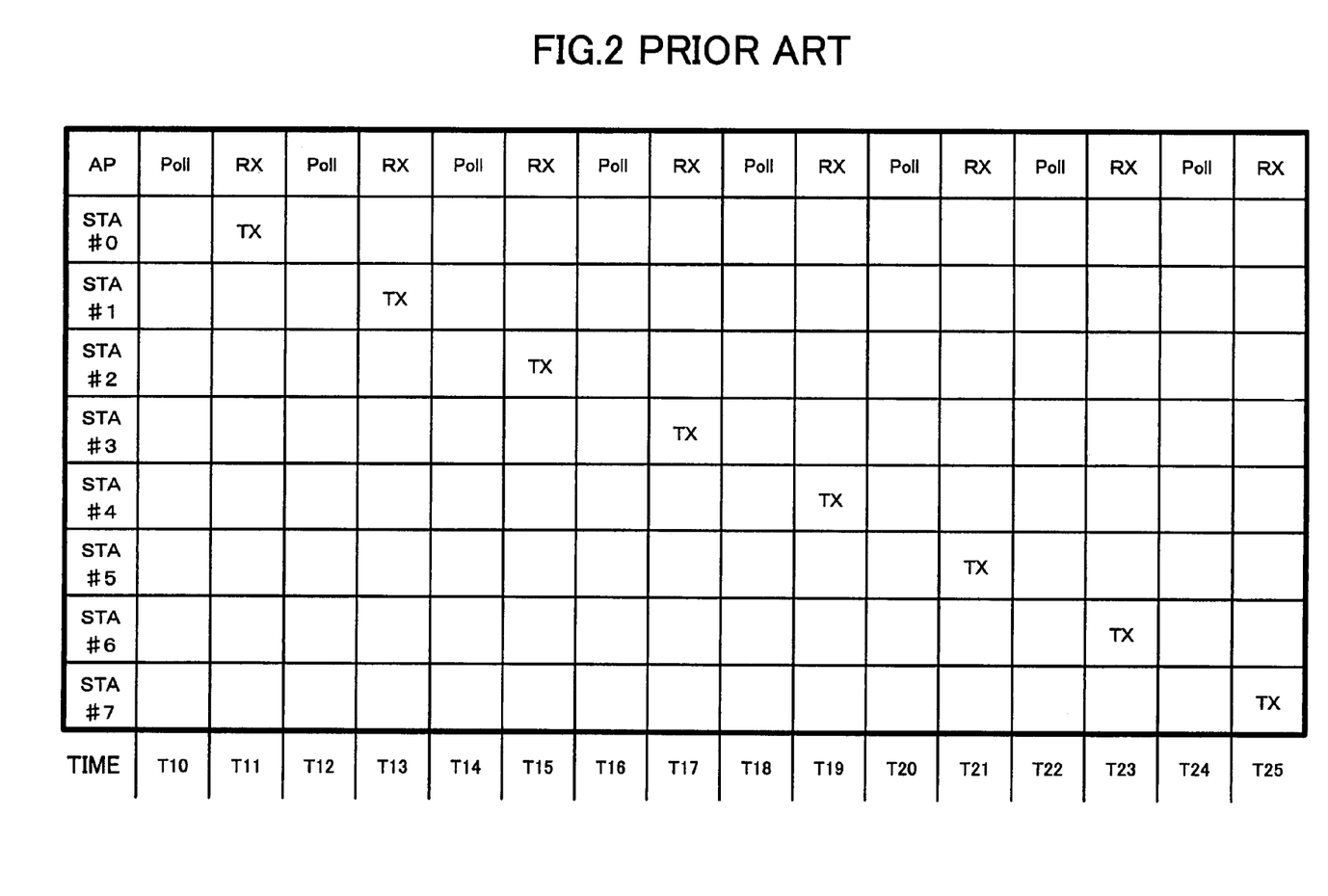
FIG. 2 is a diagram for illustrating the operation of the conventional polling communication system.

FIG. 2 is a diagram for illustrating the operation of the conventional polling communication system 1 in the case where the main station communication device 11 communicates with the eight preregistered slave station communication devices 12 by polling. In FIG. 2, AP (access point) indicates the master station communication device 11, and STAs (stations) #0 through #7 indicate the slave station communication devices 12.

First, at time T10, the master station communication device 11 transmits a request for transmission (transmission request) POLL to STA #0 of the eight slave station communication devices 12. Receiving the transmission request POLL from the master station communication device 11 at time T10, STA #0 transmits data to the master station communication device 11 at time T11. At time T11, the master station communication device 11 receives the data transmitted from STA #0.

Next, at time T12, the master station communication device transmits a transmission request POLL to STA #1. Receiving the transmission request POLL from the master station communication device 11 at time T12, STA #1 transmits data to the master station communication device 11 at time T13. At time T13, the master station communication device 11 receives the data transmitted from STA #1.

Next, at time T14, the master station communication device transmits a transmission request POLL to STA #2. Receiving the transmission request POLL from the master station communication device 11 at time T14, STA #2 transmits data to the master station communication device 11 at time T15. At time T15, the master station communication device 11 receives the data transmitted from STA #2.

Similarly, the master station communication device 11 transmits transmission requests POLL to STAs #3 through #7 successively, and receives data from corresponding STAs #3 through #7.

Such a polling communication system is disclosed in Japanese Laid-Open Patent Application No. 8-288955.

However, according to the conventional polling communication method, a master station, which polls preregistered slave stations one after another, is required to provide a poll to each slave station. Accordingly, as the number of slave stations increases, time for transmitting polls increases, thus reducing communication efficiency.

Further, since the slave stations do not know when the master station will transmit a poll, the slave stations should always be ready for receiving a poll. Accordingly, it is difficult to hold down the power consumption of the slave stations.

SUMMARY OF THE INVENTION

Accordingly, it is a general object of the present invention to provide a communication system, device and method in which the above-described disadvantages are eliminated.

A more specific object of the present invention is to provide a communication system, device, and method that can perform communications with efficiency.

The above objects of the present invention are achieved by a communication system, including: a master station communication device; and a plurality of slave station communication devices, wherein the master station communication device transmits a transmission request simultaneously to the slave station communication devices, the transmission request including identification information identifying one or more of the slave station communication devices that are authorized to transmit information and time information indicating duration of time for which the one or more of the slave station communication devices are authorized to transmit the information, and the one or more of the slave station communication devices transmit the information to the master station communication device based on the transmission request transmitted therefrom.

The above objects of the present invention are also achieved by a communication device transmitting a transmission request to a plurality of slave station communication devices and obtaining information therefrom based on the transmission request, the communication device including: a transmission request generation part configured to generate the transmission request including identification information identifying one or more of the slave station communication devices that are authorized to transmit the information and time information indicating duration of time for which the one or more of the slave station communication devices are authorized to transmit the information; and a transmission control part configured to transmit the transmission request generated by the transmission request generation part simultaneously to the slave station communication devices.

The above objects of the present invention are also achieved by a communication device transmitting information to a master station communication device based on a transmission request received therefrom, the communication device including: a transmission suspension time calculation part configured to receive the transmission request from the master station communication device, the transmission request including identification information identifying one or more communication devices that are authorized to transmit information and time information indicating duration of time for which the one or more communication devices are authorized to transmit the information, and calculate a period for which to suspend the transmission of the information from the communication device based on the identification information and the time information included in the transmission request; and a transmission suspension control part configured to suspend the transmission of the information from the communication device during the calculated period.

The above objects of the present invention are also achieved by a communication method, including the steps of: (a) a master station communication device transmitting a transmission request simultaneously to a plurality of slave station communication devices, the transmission request including identification information identifying one or more of the slave station communication devices that are authorized to transmit information and time information indicating duration of time for which the one or more of the slave station communication devices are authorized to transmit the information; and (b) the one or more of the slave station communication devices transmitting the information to the master station communication device based on the transmission request transmitted therefrom.

According to the above-described inventions, the master station communication device may simultaneously transmit a transmission request to the slave station communication devices, the transmission request including identification information identifying one or more of the slave station communication devices that are authorized to transmit information and time information indicating duration for which the transmission of the information is authorized. The one or more of the slave station communication devices may transmit the information to the master station communication device in response to the transmission request therefrom. The slave station communication devices may be informed in advance of the presence or absence of authorization to transmit the information and the authorized transmission duration. Accordingly, the one or more of the slave station communication devices may perform a communication operation only during their authorized transmission duration. Therefore, communications can be performed with efficiency. Further, the master station communication device may receive information from only the one or more of the slave station communication devices from which the information should be obtained. Accordingly, it is possible to eliminate unnecessary communications time, so that communications can be performed with efficiency.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of an embodiment of the present invention.

[System Configuration]

Figure 3:
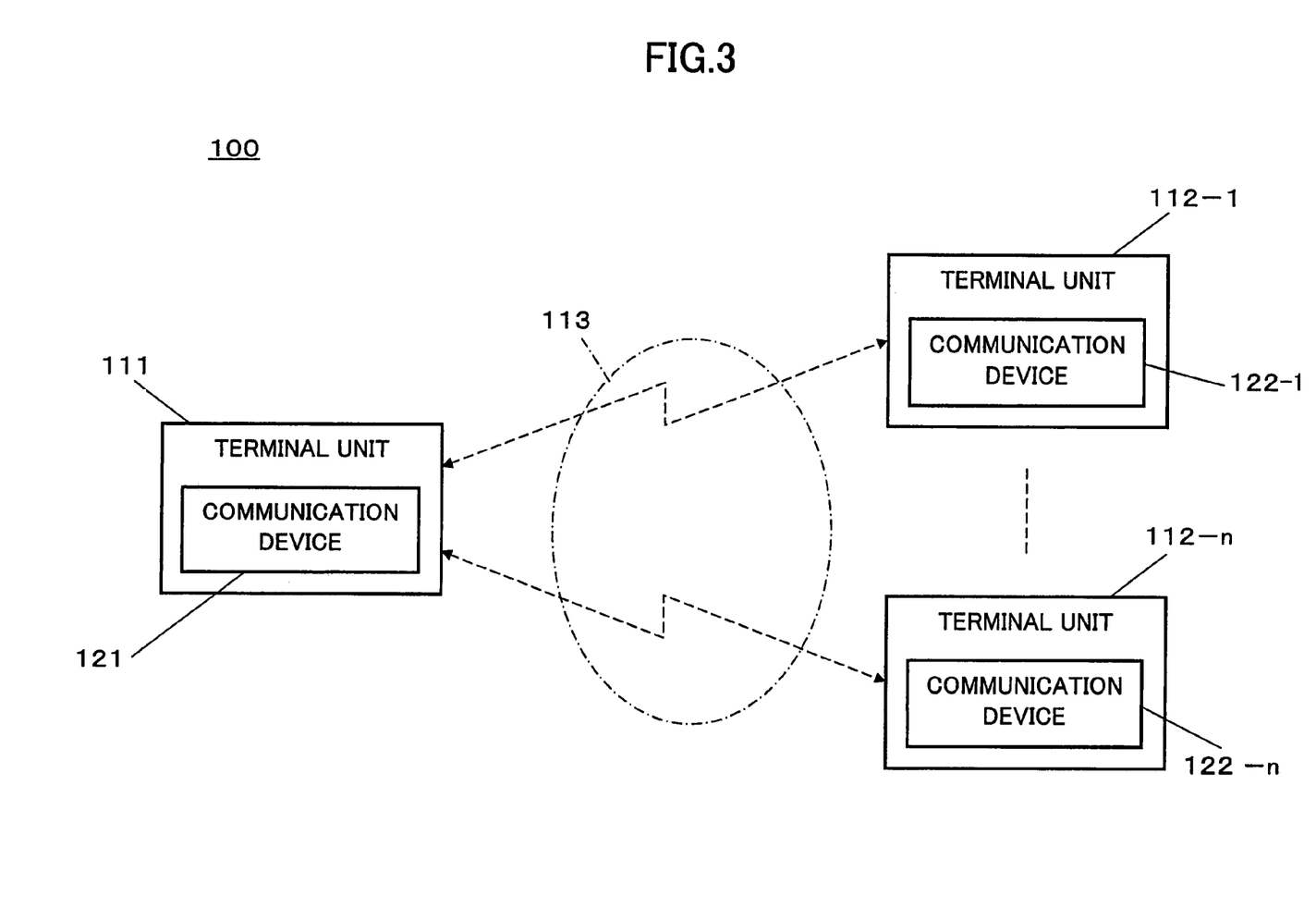
FIG. 3 is a schematic diagram showing a communication system according to an embodiment of the present invention.

FIG. 3 is a diagram showing a communication system 100 according to the embodiment of the present invention.

According to the communication system 100 of this embodiment, communications are performed via a network 113 among multiple terminal units 111 and 112-1 through 112-$n$.

The terminal unit 111 includes a communication device 121 functioning as an access point, that is, a master station. The terminal units 112-1 through 112-$n$ include respective communication devices 122-1 through 122-$n$ functioning as stations, that is, slave stations.

[Main Station Communication Device 121]

Figure 4:
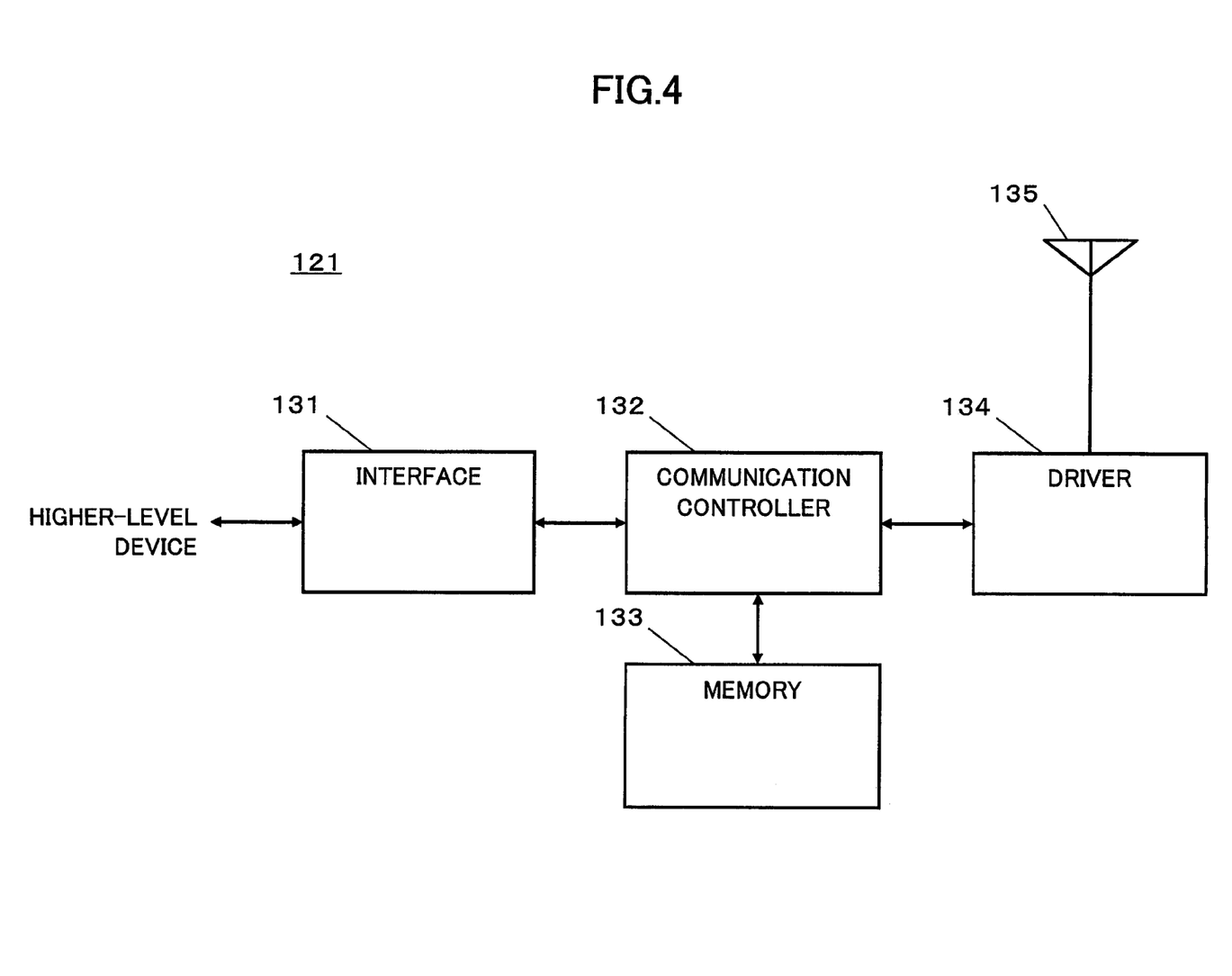
FIG. 4 is a block diagram showing a master station communication device according to the embodiment of the present invention.

FIG. 4 is a block diagram showing the master station communication device 121.

The master station communication device 121 includes an interface part 131, a communication controller 132, a memory 133, a driver 134, and an antenna 135.

The interface part 131 establishes an interface with a higher-level device inside the terminal unit 111. The communication controller 132 exchanges information with the higher-level device, and issues a request for transmission (a transmission request). The memory 133, which is formed of a RAM and a ROM, is used as a program memory, a buffer for data to be transmitted and received data, and working storage for the communication controller 132.

The transmission request and the data to be transmitted are modulated and amplified, and are provided to the antenna 135 by the driver 134. Further, a signal from any of the slave station communication devices 122-1 through 122-$n$ received by the antenna 135 is amplified and demodulated, and is provided to the communication controller 132 by the driver 134.

Next, a description is given of the operation of the master station communication device 121.

Figure 5:
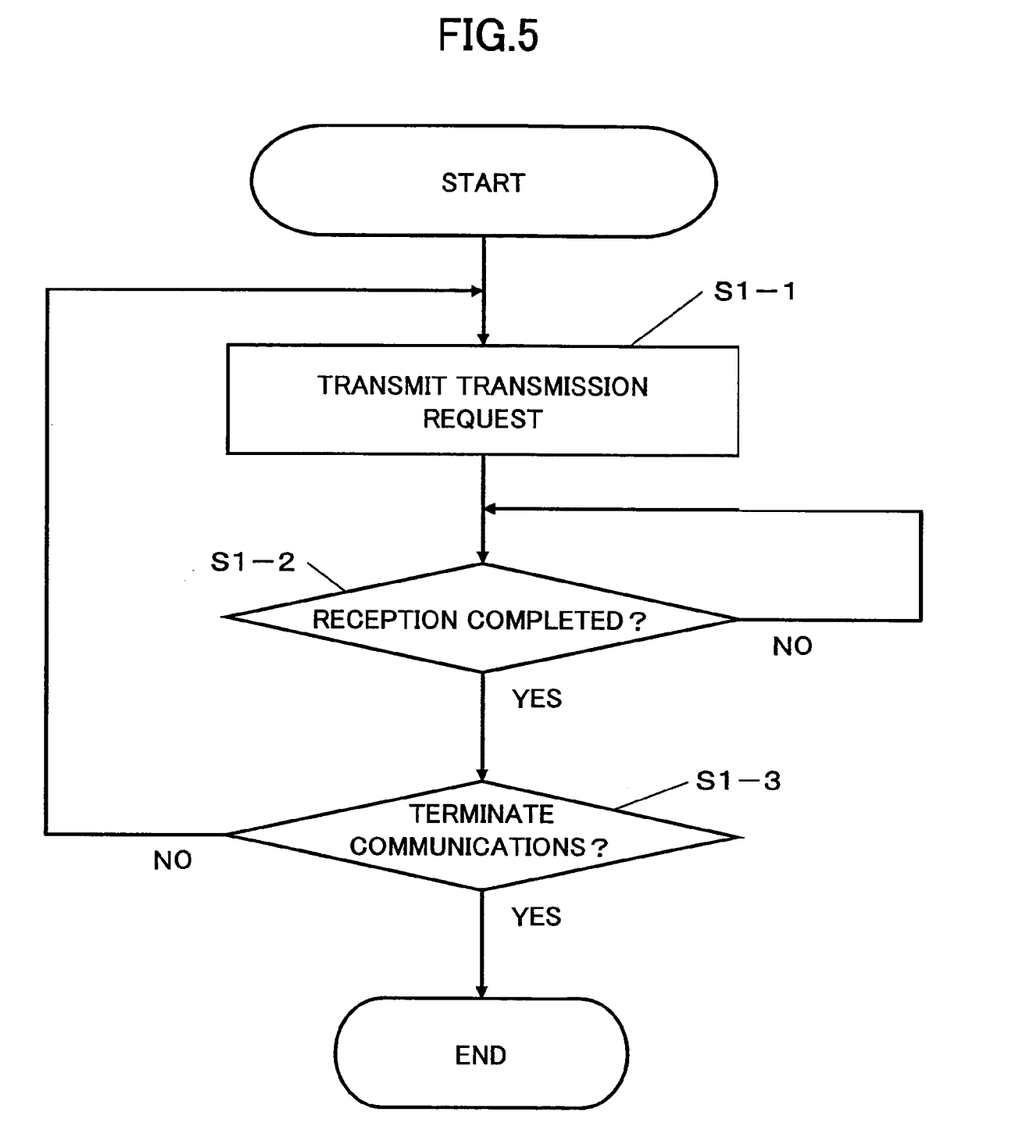
FIG. 5 is a flowchart showing an operation of the master station communication device according to the embodiment of the present invention.

FIG. 5 is a flowchart showing an operation of the master station communication device 121.

Referring to FIG. 5, in step S1-1, the master station communication device 121 transmits a transmission request to each slave station communication device 122 (representing each of the slave station communication device 122-1 through 122-$n$).

Here, a description is given of the data structure of the transmission request transmitted to each slave station communication device 122.

Figure 6:
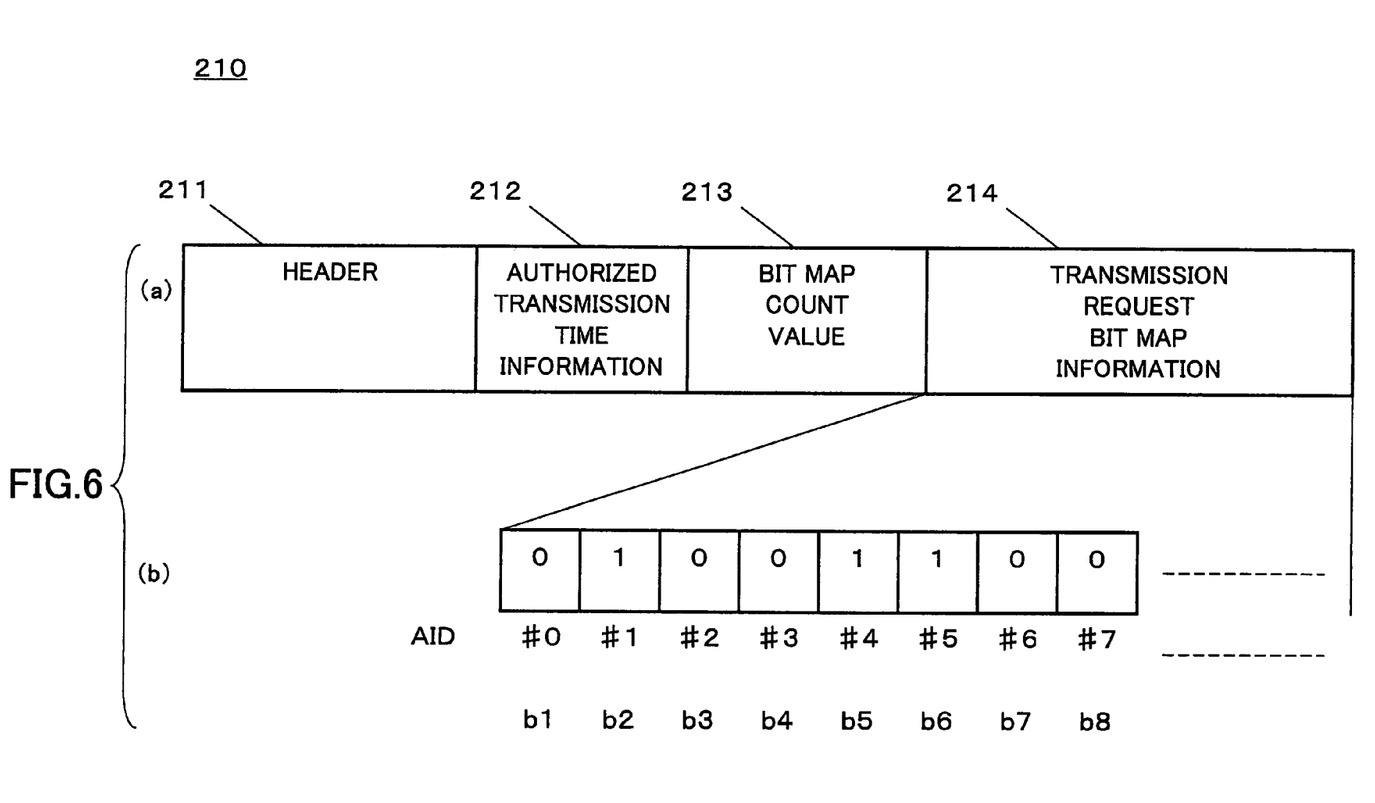
FIG. 6 is a diagram for illustrating the data structure of a transmission request according to the embodiment of the present invention.

FIG. 6 is a diagram for illustrating the data structure of a transmission request 210. In FIG. 6, (a) indicates the data structure of the transmission request 210, and (b) indicates the data structure of transmission request bit map information 214.

The transmission request 210 is composed of a header 211, authorized transmission time information 212, a bit map count value 213, and the transmission request bit map information 214.

The header 211 is information for indicating, for instance, a transmission destination address. In the header 211, every slave station communication device 122 is indicated. The authorized transmission time information 212 shows a duration or length of time, assigned to each slave station communication device 122, for which duration or length of time the slave station communication device 122 is authorized to perform transmission (communications). Hereinafter, this duration or length of time is referred to as authorized transmission duration. The bit map count value 213 represents the length of the subsequent transmission request bit map information 214, showing the number of octets. One octet is, for instance, 8 bits. The value n of the bit map count value 213 is multiplied by eight to produce n*8, which is the number of bits of the subsequent transmission request bit map information 214.

The transmission request bit map information 214 is composed of as many bits as the product of the value n of the bit map count value 213 times eight. As shown in (b) of FIG. 6, in the transmission request bit map information 214, association IDs (AIDs) are successively assigned to bits in order from the first (start) bit. That is, AID#0 is assigned to the first bit b1, AID#1 is assigned to the second bit b2, AID#2 is assigned to the third bit b3, and so on, of the transmission request bit map information 214. In this manner, the AIDs are assigned successively to the following bits.

When the value of a bit of the transmission request bit map information 214 is "1," the slave station communication device 122 of the AID corresponding to the "1" bit is authorized to perform transmission. When the value of a bit of the transmission request bit map information 214 is "0," the slave station communication device 122 of the AID corresponding to the "0" bit is inhibited from performing transmission. The slave station communication device 122 determines whether it is authorized to perform transmission, referring to the transmission request bit map information 214. When the slave station communication device 122 is authorized to perform transmission, the slave station communication device 122 counts the number of "1" bits before its own bit in the transmission request bit map information 214. Then, the slave station communication device 122 multiplies the count value (the counted number of "1" bits) by the authorized transmission duration set in the authorized transmission time information 212, thereby calculating a wait period after receiving the transmission request. After waiting for the calculated wait period after receiving the transmission request, the slave station communication device 122 transmits information to the master station communication device 121 for the authorized transmission duration. If it is impossible to transmit the information within the authorized transmission duration, the slave station communication device 122 is controlled so as not to transmit the information.

Further, the slave station communication device 122 can calculate a wait period until the transmission of the next transmission request by multiplying the authorized transmission duration set in the authorized transmission time information 212 by the total number of "1" bits set in the transmission request bit map information 214.

The transmission request bit map information 214 has its bit length managed by the bit map count value 213. When the bit map count value 213 is increased or decreased by one, the number of bits of the transmission request bit map information 214 is increased or decreased by eight. The bit map count value 213 is set so that the number of bits of the transmission request bit map information 214 is greater than or equal to the number of slave station communication devices 122.

Referring back to FIG. 5, the master station communication device 121 transmits the transmission request to each slave station communication device 122 in step S1-1, and in step S1-2, the master station communication device 121 determines whether the reception of information transmitted from the slave station communication device/devices 122 that is/are authorized to perform transmission by the transmission request has been completed. If the reception of the information has been completed (that is, "YES" in step S1-2), then, in step S1-3, the master station communication device 121 determines whether to terminate communications with the slave station communication devices 122 (122-1 through 122-n). If the master station communication device 121 does not terminate communications in step S1-3 (that is, "NO" in step S1-3), the master station communication device 121 returns to step S1-1 to transmit another transmission request to each slave station communication device 122. By repeating steps S1-1 through S1-3, the master station communication device 121 obtains information from the slave station communication devices 122 (122-1 through 122-n).

In this case, the master station communication device 121 determines the authorized transmission duration and the slave station communication device/devices 122 to be authorized to perform transmission based on an instruction from the higher-level device, and creates the transmission request shown in FIG. 6.

[Slave Station Communication Devices 122-1 through 122-n]

Next, a description is given of the slave station communication devices 122-1 through 122-n. The slave station communication devices 122-1 through 122-n have the same configuration with different AIDs. Therefore, a description is given below of one of the slave station communication devices 122-1 through 122-n, or the slave station communication device 122-i.

Figure 7:
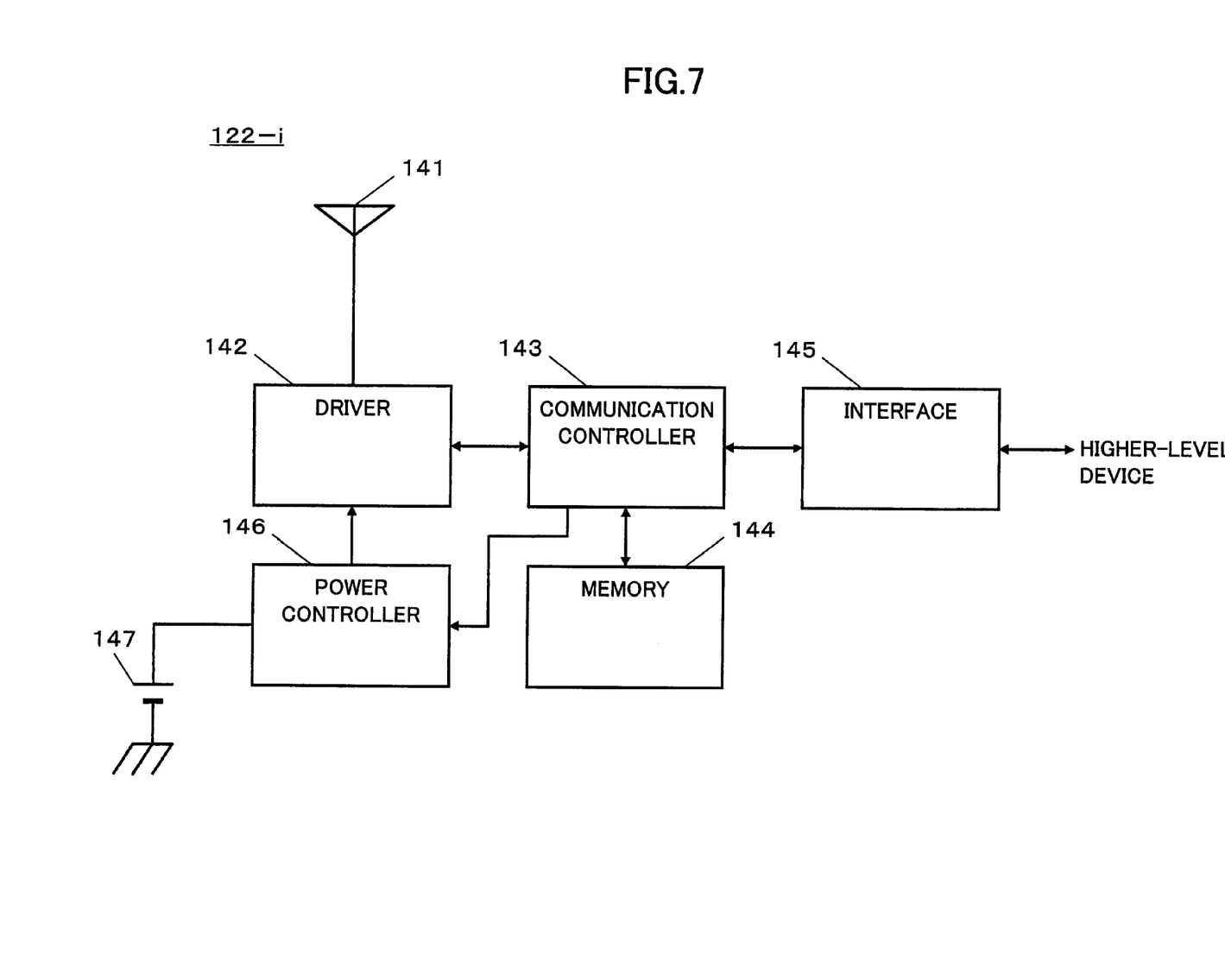
FIG. 7 is a block diagram showing a slave station communication device according to the embodiment of the present invention.

FIG. 7 is a block diagram showing the slave station communication device 122-i.

The slave station communication device 122-i includes an antenna 141, a driver 142, a communication controller 143, a memory 144, an interface part 145, a power controller 146, and a battery 147.

The driver 142 amplifies and demodulates a signal received by the antenna 141, and provides the signal to the communication controller 143. The driver 142 also modulates and amplifies information to be transmitted (transmission information) provided from the communication controller 143, and provides the transmission information to the antenna 141. The communication controller 143 receives a transmission request from the master station communication device 121, and analyzes the transmission request. Then, based on the analysis results, the communication controller 143 controls transmission from the slave station communication device 122-i to the master station communication device 121, and performs power control.

The memory 144, which is formed of a RAM and a ROM, is used as a program memory, a buffer for data to be transmitted and received data, and working storage for the communication controller 143. The interface part 145 establishes the interface between the communication controller 143 and a higher-level device inside the terminal unit 112-*i*. The power controller 146 controls the supply of power from the battery 147 to the driver 142 in accordance with a control signal provided from the communication controller 143.

Figure 8:
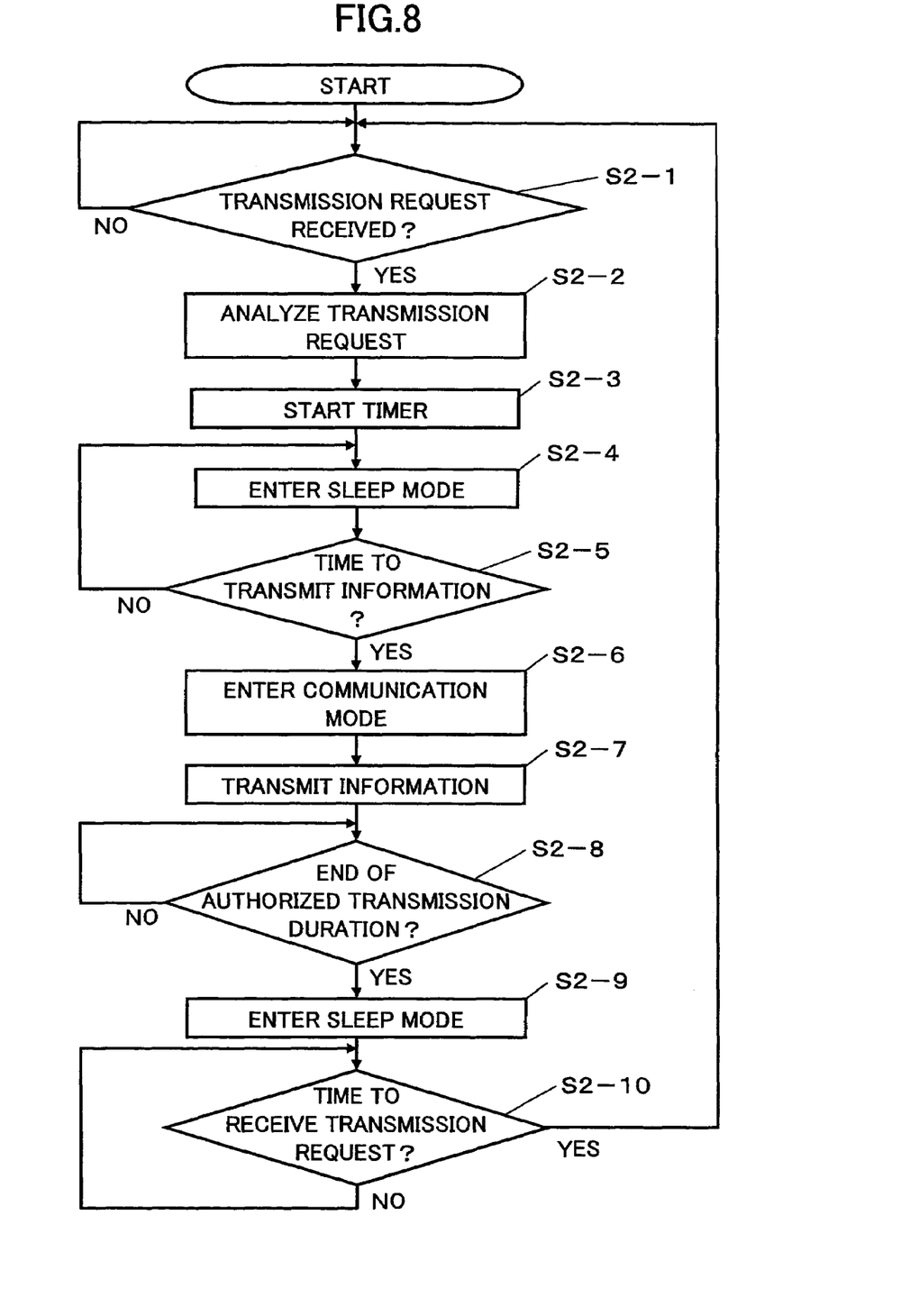
FIG. 8 is a flowchart showing an operation of the slave station communication device according to the embodiment of the present invention.

FIG. 8 is a flowchart showing an operation of the slave station communication device 122-*i*.

Referring to FIG. 8, in step S2-1, the slave station communication device 122-*i* determines whether the transmission request 210 from the master station communication device 121 has been received. When the transmission request 210 is received (that is, "YES" in step S2-1), then, in step S2-2, the slave station communication device 122-*i* analyzes the contents of the transmission request 210. The slave station communication device 122-*i* can determine whether received information is the transmission request 210 by analyzing the header of the received information (for instance, the header 211 of the transmission request 210).

By analyzing the transmission request 210 in step S2-2, the slave station communication device 122-*i* obtains the authorized transmission duration from the authorized transmission time information 212, and obtains the AIDs and the total number of "1" bits from the transmission request bit map information 214. The slave station communication device 122-*i* calculates a wait period until the reception of the next transmission request 210 by multiplying the authorized transmission duration by the total number of "1" bits of the transmission request bit map information 214. Further, the slave station communication device 122-*i* calculates a wait period until the transmission of information therefrom by multiplying the authorized transmission duration by the number of "1" bits with respect to AIDs before the AID of the slave station communication device 122-*i*.

In step S2-3, the slave station communication device 122-*i* starts a built-in timer to start to measure the wait periods. In step S2-4, the slave station communication device 122-*i* enters a sleep mode. In the sleep mode, the slave station communication device 122-*i* controls the power controller 146 to stop the supply of power to the driver 142, and stops functions other than the time measuring function of the built-in timer. As a result, power consumption can be greatly reduced.

In step S2-5, the slave station communication device 122-*i* determines whether the measured time of the built-in timer has reached a time to transmit information. If the measured time has reached the time to transmit information (that is, "YES" in step S2-5), in step S2-6, the slave station communication device 122-*i* enters a communication mode. In the communication mode, the slave station communication device 122-*i* causes at least the function for transmitting information of the communication controller 143 to operate, and controls the power controller 146 so that power is supplied from the battery 147 to the driver 142. As a result, the slave station communication device 122-*i* can transmit information.

In step S2-7, the slave station communication device 122-*i* transmits information to the master station communication device 121. The slave station communication device 122-*i* transmits information by the end of the authorized transmission duration. In step S2-8, the slave station communication device 122-*i* determines whether the authorized transmission duration has ended. If the authorized transmission duration has ended (that is, "YES" in step S2-8), in step S2-9, the slave station communication device 122-*i* again enters a sleep mode until the slave station communication device 122-*i* determines in step S2-10 that a time to receive the next transmission request 210 has arrived. When the time to receive the next transmission request 210 arrives (that is, "YES" in step S2-10), the slave station communication device 122-*i* returns to step S2-1 to receive the next transmission request 210, and performs transmission control in accordance with the transmission request 210.

According to this embodiment, the slave station communication device 122-*i* may operate at the time of receiving the transmission request 210 from the master station communication device 121 and during a predetermined period of time for which the slave station communication device 122-*i* is authorized to perform transmission based on the transmission request 210, and enter a sleep mode in the remaining time. Accordingly, power consumption can be greatly reduced.

[Description of Operation]

Next, a description is given of the operation of the entire communication system 100.

Figure 9:
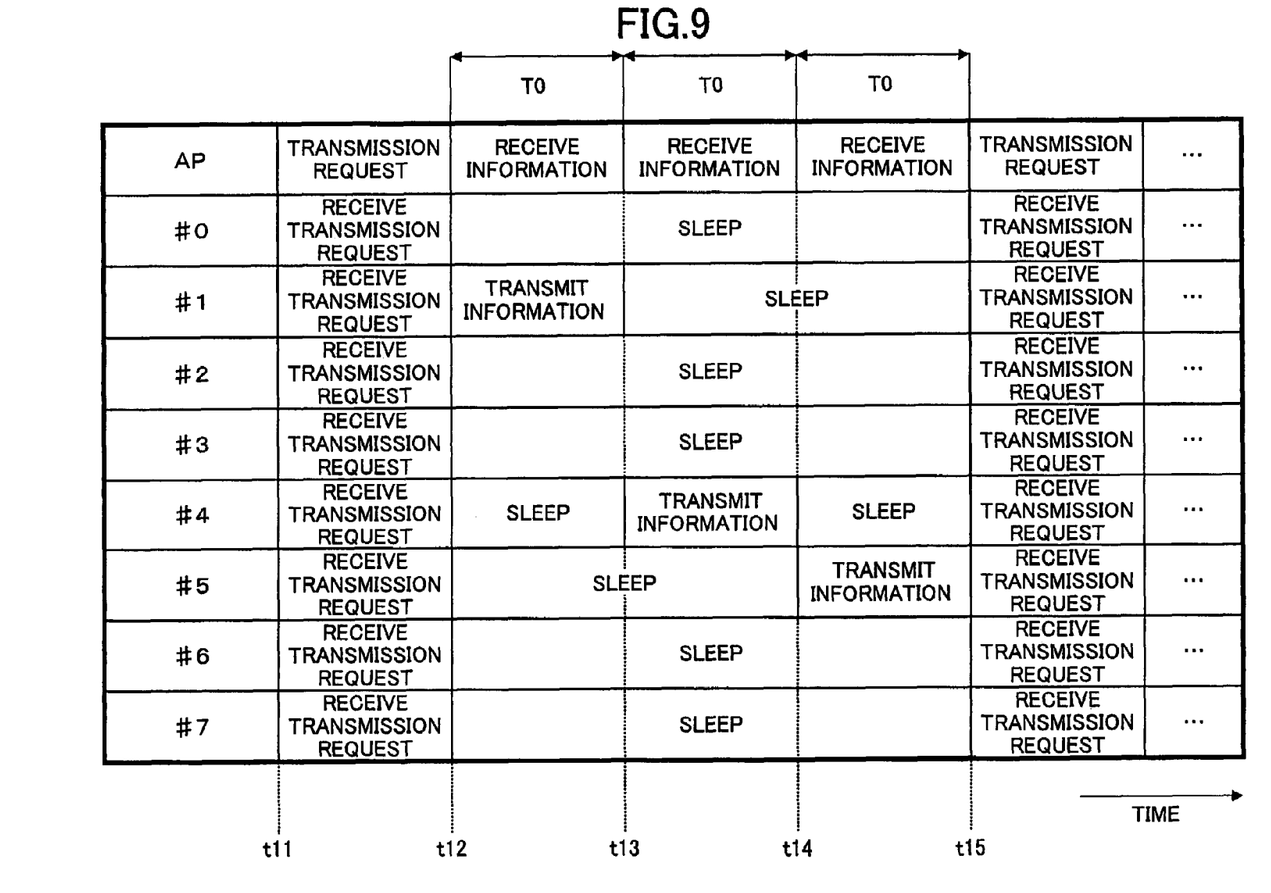
FIG. 9 is a diagram for illustrating an operation of the communication system according to the embodiment of the present invention.

FIG. 9 is a diagram for illustrating an operation of the communication system 100 according to this embodiment. In FIG. 9, time is shown horizontally. In the case of FIG. 9, it is assumed for simplification of description that the eight slave station communication devices 122-1 through 122-8, represented by AID#0 through AID#7, respectively, can communicate with the master station communication device 121. A description is given below of the case where AID#1, AID#4, and AID#5 of AID#0 through AID#7 are informed of their authorization to perform transmission.

When the master station communication device 121, which is an access point (AP), transmits the transmission request 210 at time t11, all of the slave station communication devices AID#0 through AID#7 (122-1 through 122-8), which are stations (STAs), receive the transmission request 210. Next, at time t12, when completing reception of the transmission request 210, the slave station communication device AID#1 transmits information for an authorized transmission duration T0. During this period, the other slave station communication devices AID#0 and AID#2 through AID#7 are in a sleep mode.

Next, at time t13, the slave station communication device AID#4 transmits information for the authorized transmission duration T0. During this period, the other slave station communication devices AID#0 through AID#3 and AID#5 through AID#7 are in a sleep mode. Next, at time t14, the slave station communication device AID#5 transmits information for the authorized transmission duration T0. During this period, the other slave station communication devices AID#0 through AID#4, AID#6, and AID#7 are in a sleep mode.

Next, at time t15, when the transmission of information from the slave station communication devices AID#1, AID#4, and AID#5, corresponding to bits in which "1" is set in the transmission request bit map information 214, is completed, the master station communication device 121 transmits the next transmission request 210 to the slave station communication devices AID#0 through AID#7.

Thus, according to this embodiment, the master station communication device 121 can request the transmission of information in a single transmission request (poll). Further, based on the transmission request 210, the slave station communication device 122-*i* can predict a time to transmit information therefrom and a time to receive the next transmission request 210 from the master station communication device 121. As a result, the slave station communication device 122-*i* can enter a sleep mode in the remaining time. Accordingly, it is possible to reduce power consumption.

Thus, according to this embodiment, overhead by frame transmission can be reduced. Accordingly, performance can be improved.

[Variation]

In this embodiment, constant authorized transmission duration is given irrespective of the slave station communication devices 122. Alternatively, the authorized transmission duration may be set independently for each slave station communication device 122 authorized to perform transmission.

Figure 10:
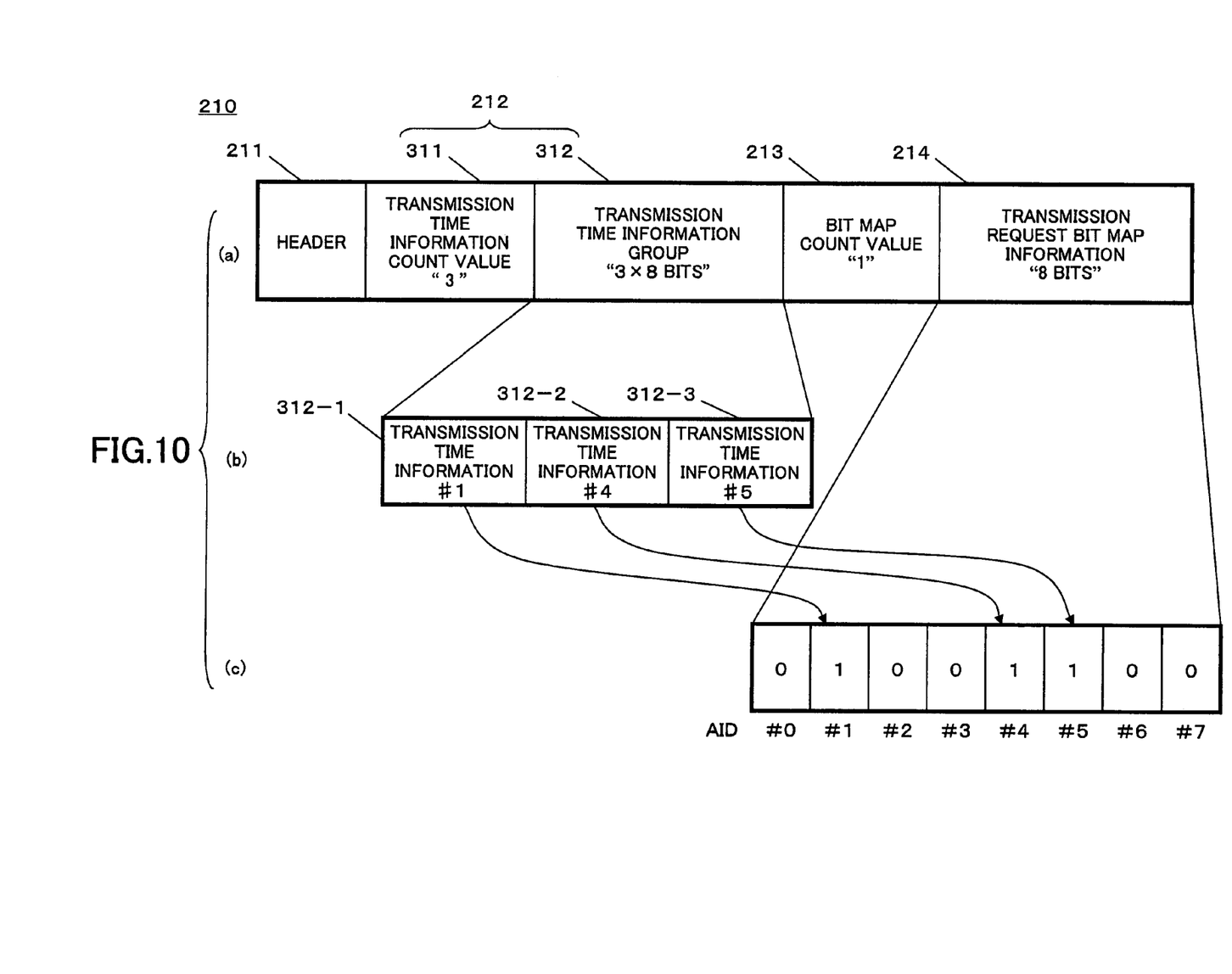
FIG. 10 is a diagram for illustrating the data structure of the transmission request according to a variation of the embodiment of the present invention.

FIG. 10 is a diagram for illustrating the data structure of the transmission request 210 according to a variation of this embodiment. In FIG. 10, the same elements as those in FIG. 6 are referred to by the same numerals, and a description thereof is omitted.

In the transmission request 210 of FIG. 10, the authorized transmission time information 212 is composed of a transmission time information count value 311 and a transmission time information group 312.

The number of octets of the transmission time information group 312 is set in the transmission time information count value 311. The number of octets corresponds to, for instance, the total number of "1" bits set in the transmission request bit map information 214. As shown in (a) of FIG. 10, in the case of authorizing the slave station communication devices AID#1, AID#4, and AID#5 to perform transmission, their total number "3" is set.

As many authorized transmission durations as the number set in the transmission time information count value 311 are set in the transmission time information group 312. As shown in FIG. 10, in the case of authorizing the slave station communication devices AID#1, AID#4, and AID#5 to perform transmission, three pieces of transmission time information 312-1 through 312-3 are set (as indicated by (b) of FIG. 10). The transmission time information 312-1 is an authorized transmission duration set for the slave station communication device AID#1 corresponding to the first "1" bit in the transmission request bit map information 214 (as shown in (b) and (c) of FIG. 10). The transmission time information 312-2 is an authorized transmission duration set for the slave station communication device AID#4 corresponding to the second "1" bit in the transmission request bit map information 214 (as shown in (b) and (c) of FIG. 10). The transmission time information 312-3 is an authorized transmission duration set for the slave station communication device AID#5 corresponding to the third "1" bit in the transmission request bit map information 214 (as shown in (b) and (c) of FIG. 10).

Thus, according to the transmission request 210 of this variation shown in FIG. 10, the authorized transmission duration may be set for each slave station communication device 122 authorized to perform transmission.

Figure 11:
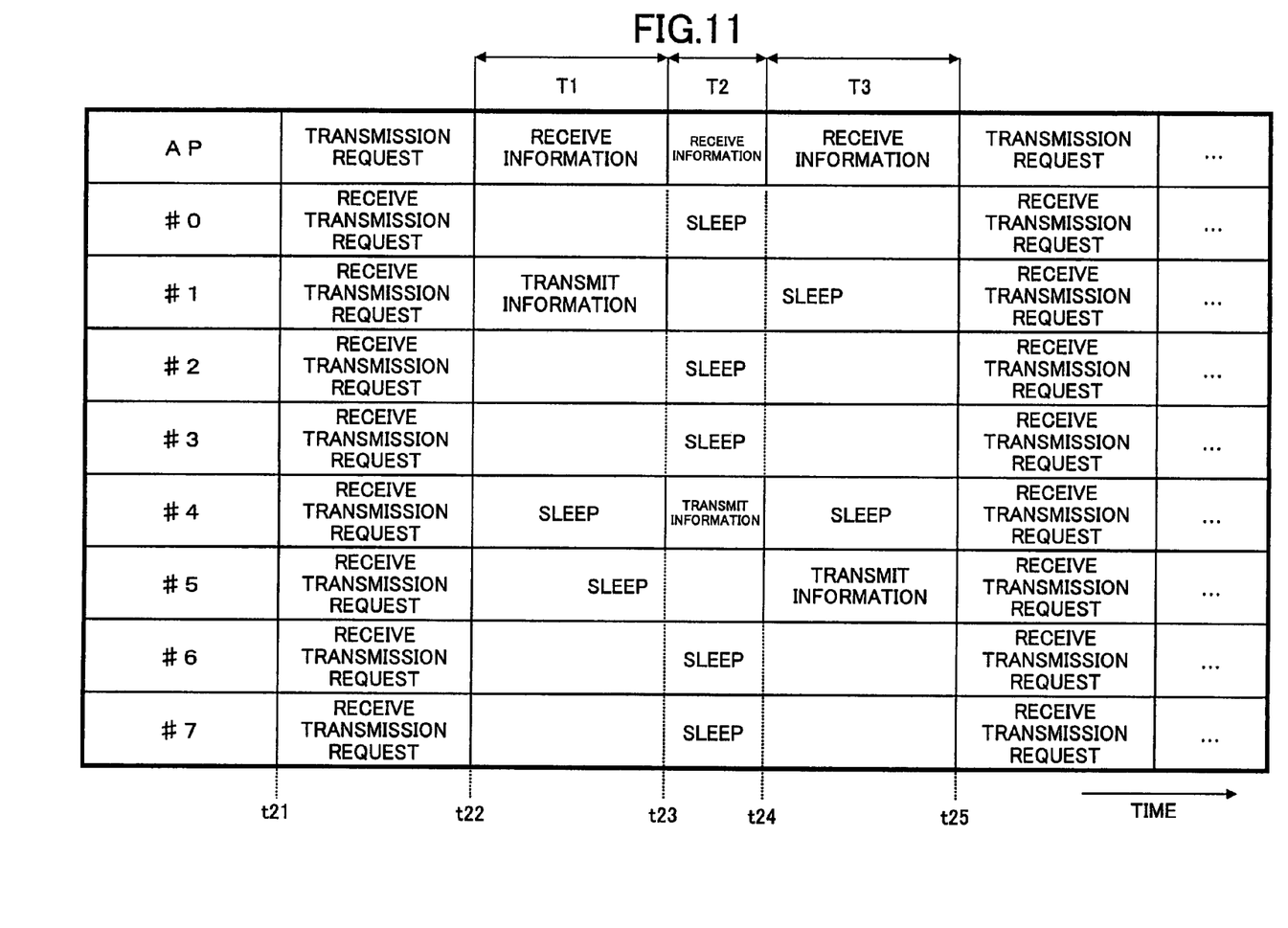
FIG. 11 is a diagram for illustrating an operation of the communication system according to the variation of the embodiment of the present invention.

FIG. 11 is a diagram for illustrating an operation of the communication system 100 according to the variation of this embodiment. In the following, it is assumed for simplification of description that the eight slave station communication devices 122-1 through 122-8, represented by AID#0 through AID#7, respectively, can communicate with the master station communication device 121. A description is given below of the case where AID#1, AID#4, and AID#5 of AID#0 through AID#7 are informed of their authorization to perform transmission.

Referring to FIG. 11, when the master station communication device 121, which is an access point (AP), transmits the transmission request 210 at time t21, all of the slave station communication devices AID#0 through AID#7 (122-1 through 122-8), which are stations (STAs), receive the transmission request 210. Next, at time t22, when completing reception of the transmission request 210, the slave station communication device AID#1 transmits information for an authorized transmission duration T1 set in the transmission time information 312-1. During this period, the other slave station communication devices AID#0 and AID#2 through AID#7 are in a sleep mode.

Next, at time t23, the slave station communication device AID#4 transmits information for an authorized transmission duration T2 set in the transmission time information 312-2. During this period, the other slave station communication devices AID#0 through AID#3 and AID#5 through AID#7 are in a sleep mode. Next, at time t24, the slave station communication device AID#5 transmits information for an authorized transmission duration T3 set in the transmission time information 312-3. During this period, the other slave station communication devices AID#0 through AID#4, AID#6, and AID#7 are in a sleep mode.

Next, at time t25, when the transmission of information from the slave station communication devices AID#1, AID#4, and AID#5, corresponding to bits in which "1" is set in the transmission request bit map information 214, is completed, the master station communication device 121 transmits the next transmission request 210 to the slave station communication devices AID#0 through AID#7.

Thus, according to the variation of this embodiment, a different authorized transmission duration may be set for each slave station communication device 122 based on the settings provided from the master station communication device 121. As a result, for each slave station communication device 122, an authorized transmission duration suitable for information to be transmitted therefrom can be set. Accordingly, information can be transmitted with more efficiency, so that power consumption can be further reduced.

According to the present invention, the master station communication device 121 may simultaneously transmit a transmission request to the slave station communication devices 122-1 through 122-n, the transmission request including identification information identifying the slave station communication device 122-i that is authorized to perform transmission and information on a duration for which the slave station communication device 122-i is authorized to perform transmission. The slave station communication device 122-i may transmit information to the master station communication device 121 in response to the transmission request therefrom. The slave station communication devices 122-1 through 122-n may be informed in advance of the presence or absence of authorization to transmit information and an authorized transmission duration. Accordingly, the slave station communication device 122-i may perform a communication operation only during its authorized transmission duration. Therefore, communications can be performed with efficiency. Further, the master station communication device 121 may receive information from only the slave station communication device 122-i from which information should be obtained. Accordingly, it is possible to eliminate unnecessary communications time, so that communications can be performed with efficiency.

The present invention is not limited to the specifically disclosed embodiment, and variations and modifications may be made without departing from the scope of the present invention.

The present application is based on Japanese Priority Patent Application No. 2003-206299, filed on Aug. 6, 2003, the entire contents of which are hereby incorporated by reference.

What is claimed is:

1. A communication system, comprising:
   a master station communication device; and
   a plurality of slave station communication devices, each slave station communication device is assigned a unique associated identification (AID) to correspond to a unique bit order sequence number in a bit map information component of a transmission request,
   wherein the master station communication device transmits the transmission request simultaneously to all the slave station communication devices, the transmission request including:
      the bit map information component containing identification information identifying one or more of the slave station communication devices that are authorized to transmit information wherein authorization of each particular slave station communication device occurs when a "1" bit is in the bit order sequence number of the bit map information component corresponding to the AID of that particular slave station communication device; and
      an authorized transmission time information component containing time information indicating duration of time when each authorized slave station communication device is to transmit the information,
      wherein a unique waiting period is determined for each authorized slave station communication device by counting the number of "1" bits in the bit map information component located before the unique bit order sequence number corresponding the AID of each authorized slave station communication device,
      wherein each authorized slave station communication device transmits information after each corresponding unique waiting period to the master station communication device based on the transmission request transmitted therefrom, and
   all of the slave station communication devices enter a sleep mode after receiving the transmission request except during the time for which each authorized slave station communication devices are authorized to transmit the information.

2. The communication system as claimed in claim 1, wherein the duration of time indicated by the time information is common to the authorized slave station communication devices.

3. The communication system as claimed in claim 1, wherein the duration of time indicated by the time information is different for each of the authorized slave station communication devices.

4. The communication system as claimed in claim 1, wherein the duration of time indicated by the time information is set independently for each of the authorized slave station communication devices.

5. A communication device transmitting a transmission request to a plurality of slave and obtaining information therefrom based on the transmission request, the communication device comprising:
   a transmission request generation part configured to generate the transmission request including:
      a bit map information component containing identification information identifying one or more of the slave stations that are authorized to transmit the information wherein authorization of each particular slave station occurs when a "1" bit is in a bit order sequence number of the bit map information component corresponding to a unique associated identification (AID) of that particular slave station; and
      an authorized transmission time information component containing time information indicating duration of time for when each authorized slave station is to transmit the information, wherein a unique waiting period is determined for each authorized slave station by counting the number of "1" bits in the bit map information component located before the unique bit order sequence number corresponding to the AID of each authorized slave station, wherein each authorized slave station transmits information after each corresponding unique waiting period to the communication device based on the transmission request transmitted therefrom, wherein
      each authorized slave station enters a sleep mode after receiving the transmission request except during the time when each authorized slave station is authorized to transmit the information; and
   a transmission control part configured to transmit the transmission request generated by the transmission request generation part simultaneously to all of the slave stations.

6. A plurality of communication devices transmitting information to a master station based on a transmission request received therefrom, each communication device comprising:
   a transmission suspension time calculation part configured to receive the transmission request from the master station, the transmission request including:
      a bit map information component containing identification information identifying one or more of the communication devices that are authorized to transmit information wherein authorization of each particular communication device occurs when a "1" bit is in a bit order sequence number of the bit map information component corresponding to a unique associated identification (AID) of the particular communication device, and
      an authorized transmission time information component containing time information indicating duration of time when each authorized communication device is authorized to transmit the information, wherein a unique waiting period is determine each authorized communication device by counting the number of "1" bits in the bit map information component located before the unique bit order sequence number corresponding to the AID of each authorized communication device, wherein each authorized communication device transmits information after each corresponding unique waiting period to the master station based on the transmission request transmitted therefrom, wherein a period for which to suspend the transmission of the information from the authorized communication devices is calculated based on the identification information and the time information included in the transmission request; and
   a transmission suspension control part configured to suspend the transmission of the information from the communication device during the calculated period,
   wherein the communication device enters a sleep mode during the calculated period.

7. A communication method, comprising the steps of:
(a) a master station transmitting a transmission request simultaneously to a plurality of slave stations, the transmission request including:
   a bit map information component containing identification information identifying one or more of the slave stations that are authorized to transmit information wherein authorization of each particular slave station occurs when a "1" is in a bit order sequence number of the bit man information component corresponding to a unique associated identification (AID) of that particular slave station; and an authorized transmission time information component containing time information indicating duration of time when each authorized slave station is authorized to transmit the information, wherein a unique waiting period is determined for each authorized slave station by counting the number of "1" bits in the bit map information component located before the unique bit order sequence number corresponding to the AID of each authorized slave station communication device; and (b) each authorized slave station transmitting after each unique waiting period the information to the master station based on the transmission request transmitted therefrom, wherein the one or more of the slave station communication devices enter a sleep mode after receiving the transmission request except during the time for which the authorized slave station communication devices are authorized to transmit the information.

8. A communication system, comprising:

a master station communication device; and a plurality of slave station communication devices, wherein the master station communication device transmits a transmission request simultaneously to all the slave station communication devices, the transmission request including:

a bit map information component containing identification information identifying authorized slave station communication devices that are authorized to transmit information, a bit map count component containing information of a length of the bit map information component, and an authorized transmission time information component containing time information indicating duration of time for which the authorized slave station communication devices are authorized to transmit the information, the authorized slave station communication devices transmit the information to the master station communication device based on the duration of time information contained in the authorized transmission time information component of the transmission request transmitted therefrom, and the one or more of the slave station communication devices enters a sleep mode after receiving the transmission request except during the time for which the one or more of the slave station communication devices are authorized to transmit the information.

9. The communication system as claimed in claim 8, wherein the duration of time indicated by the time information is common to the authorized slave station communication devices.

10. The communication system as claimed in claim 8, wherein the duration of time indicated by the time information is different for each of the authorized slave station communication devices.

11. The communication system as claimed in claim 8, wherein the duration of time indicated by the time information is set independently for each of the authorized slave station communication devices.

* * * * *

UNITED STATES PATENT AND TRADEMARK OFFICE
CERTIFICATE OF CORRECTION

PATENT NO. : 7,356,018 B2  
APPLICATION NO. : 10/881265  
DATED : April 8, 2008  
INVENTOR(S) : Hideo Seyama et al.

Page 1 of 1

It is certified that error appears in the above-identified patent and that said Letters Patent is hereby corrected as shown below:

On the Title Page  
Section (75)    After "Yoshihide Majima, Tama (JP)", add  
--Masato Kuwahara, Kyoto (JP),  
Shoya Tanaka, Kyoto (JP)--.

Signed and Sealed this

Nineteenth Day of August, 2008

JON W. DUDAS  
*Director of the United States Patent and Trademark Office*